(12) United States Patent  
Fu et al.

(10) Patent No.: US 11,860,997 B2  
(45) Date of Patent: Jan. 2, 2024

(54) METHOD AND APPARATUS FOR ATTESTATION

(71) Applicant: Nokia Technologies Oy, Espoo (FI)

(72) Inventors: Anmin Fu, Shaanxi (CN); Jingyu Feng, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 564 days.

(21) Appl. No.: 17/253,056

(22) PCT Filed: Jun. 26, 2018

(86) PCT No.: PCT/CN2018/092814  
§ 371 (c)(1),  
(2) Date: Dec. 16, 2020

(87) PCT Pub. No.: WO2020/000173  
PCT Pub. Date: Jan. 2, 2020

(65) Prior Publication Data  
US 2021/0271751 A1    Sep. 2, 2021

(51) Int. Cl.  
*G06F 21/54*    (2013.01)  
*H04L 9/32*    (2006.01)

(52) U.S. Cl.  
CPC ............ *G06F 21/54* (2013.01); *H04L 9/3236* (2013.01); *H04L 9/3247* (2013.01); *G06F 2221/033* (2013.01)

(58) Field of Classification Search  
CPC .... G06F 21/54; G06F 2221/033; G06F 21/44; G06F 21/57; G06F 21/64; H04L 9/3236; H04L 9/3247  
See application file for complete search history.

(56) References Cited

U.S. PATENT DOCUMENTS

| | | | |
|---|---|---|---|
| 8,595,506 B2 | 11/2013 | Robshaw et al. | |
| 2009/0282393 A1* | 11/2009 | Costa | G06F 21/54 |
| | | | 717/134 |
| 2017/0017789 A1* | 1/2017 | Daymont | G06F 21/566 |
| 2018/0248873 A1* | 8/2018 | Loreskar | H04L 9/3271 |
| 2019/0199530 A1* | 6/2019 | Reitsma | H04L 9/3247 |

(Continued)

FOREIGN PATENT DOCUMENTS

| | | |
|---|---|---|
| CN | 1048111 A | 12/1990 |
| CN | 102129537 A | 7/2011 |

(Continued)

OTHER PUBLICATIONS

Higgins et al., "Threats to the Swarm: Security Considerations for Swarm Robotics", International Journal on Advances in Security, vol. 2, No. 2&3, 2009, pp. 288-297.

(Continued)

*Primary Examiner* — J. Brant Murphy  
(74) *Attorney, Agent, or Firm* — Nokia Technologies Oy

(57) ABSTRACT

Methods and apparatus are disclosed for attesting integrity of a program. A method may comprise: sending to a second device a first request for validating integrity of a program on the second device; receiving a first response from the second device, wherein the first response comprises information regarding one or more tags collected during operation of the program; and attesting integrity of the program based on the first response and an expected response.

20 Claims, 11 Drawing Sheets normal tag data tag iteration tag

(56) References Cited

U.S. PATENT DOCUMENTS

2021/0026934 A1* 1/2021 Boling .................... G06F 8/447
2021/0073375 A1* 3/2021 Milburn .................. G06F 21/54

FOREIGN PATENT DOCUMENTS

CN          104268165 A     1/2015
WO       2017/210005 A1    12/2017

OTHER PUBLICATIONS

Miller et al., "A Survey of SCADA and Critical Infrastructure Incidents", Proceedings of the 1st Annual conference on Research in information technology, Oct. 11-13, 2012, pp. 51-56.
Steiner et al., "Attestation in Wireless Sensor Networks: A Survey", ACM Computing Surveys, vol. 49, No. 3, Sep. 2006, pp. 1-31.
Costin et al., "A Large-Scale Analysis of the Security of Embedded Firmwares", Proceedings of the 23rd USENIX conference on Security Symposium, Aug. 2014, pp. 95-110.
Asokan et al., "SEDA: Scalable Embedded Device Attestation", Proceedings of the 22nd ACM SIGSAC Conference on Computer and Communications Security, Oct. 12-16, 2015, pp. 964-975.
Ambrosin et al., "SANA: Secure and Scalable Aggregate Network Attestation", Proceedings of the 2016 ACM SIGSAC Conference on Computer and Communications Security, Oct. 24-28, 2016, pp. 731-742.
El Defrawy et al., "SMART: Secure and Minimal Architecture for (Establishing a Dynamic) Root of Trust", Project: Cyber-physical and Embedded Systems Security, Jan. 2012, 15 pages.
Koeberl et al., "TrustLite: A Security Architecture for Tiny Embedded Devices", Proceedings of the Ninth European Conference on Computer Systems, Apr. 13-16, 2014, 14 pages.
Brasser et al., "TyTAN: Tiny Trust Anchor for Tiny Devices", Proceedings of the 52nd Annual Design Automation Conference, Jun. 7-11, 2015, 6 pages.
Cowan et al., "StackGuard: Automatic Adaptive Detection and Prevention of Buffer-Overflow Attacks", Proceedings of the 7th conference on USENIX Security Symposium, vol. 7, Jan. 1998, 15 pages.
Abadi et al., "Control-Flow Integrity", Proceedings of the 12th ACM conference on Computer and communications security, Nov. 7-11, 2005, pp. 340-353.
Kuznetzov et al., "Code-Pointer Integrity", Proceedings of the 11th USENIX Symposium on Operating Systems Design and Implementation, 2014, pp. 147-163.
Abera et al., "C-FLAT: Control-Flow Attestation for Embedded Systems Software", Proceedings of the 2016 ACM SIGSAC Conference on Computer and Communications Security, Oct. 24-28, 2016, pp. 743-754.
Dessouky et al., "LO-FAT: Low-Overhead Control Flow ATtestation in Hardware", Proceedings of the 54th Annual Design Automation Conference 2017, Article No. 24, Jun. 18-22, 2017, 6 pages.
Zeitouni et al., "ATRIUM: Runtime Attestation Resilient Under Memory Attacks", IEEE/ACM International Conference on Computer-Aided Design (ICCAD), Nov. 13-16, 2017, pp. 384-391.
Ven, "New Security Enhancements in Red Hat Enterprise Linux V.3, Update 3", Redhat, Aug. 2004, pp. 1-10.
"PaX ASLR (Address Space Layout Randomization)", Pax-Team, Retrieved on Dec. 16, 2020, Webpage available at : http://pax.grsecurity.net/docs/aslr.txt.
Cheng et al., "Orpheus: Enforcing Cyber-Physical Execution Semantics to Defend Against Data-Oriented Attacks", Proceedings of the 33rd Annual Computer Security Applications Conference, Dec. 2017, pp. 315-326.
International Search Report and Written Opinion received for corresponding Patent Cooperation Treaty Application No. PCT/CN2018/092814, dated Mar. 19, 2019, 9 pages.
Extended European Search Report received for corresponding European Patent Application No. 18924922.0, dated Dec. 13, 2021, 7 pages.
Sun et al., "OEI: Operation Execution Integrity for Embedded Devices", arXiv, Feb. 9, 2018, pp. 1-16.

* cited by examiner

METHOD AND APPARATUS FOR ATTESTATION

RELATED APPLICATION

This application claims priority to PCT Application No. PCT/CN2018/092814, filed on Jun. 26, 2018, PCT/CN2018/092814, which is incorporated herein by reference in its entirety.

FIELD OF THE INVENTION

Embodiments of the disclosure generally relate to information technology, and more particularly, to attestation for integrity of a program.

BACKGROUND

Electronic apparatuses such as Internet of Things (IoT) devices, machine-to-machine (M2M) devices and/or wireless sensor networks (WSNs) have a broad range of applications that can be employed to a wide variety of scenarios such as industrial production, medical, household, smart office, city construction and daily wear, medical emergency detection, volcano monitoring, forest fire detection, scene reconstruction, event detection, video surveillance, traffic surveillance, driver assistant systems, Advanced Driver Assistant Systems (ADAS), unmanned aircraft system (UAS), autonomous vehicle, traffic monitoring, public security, sensor-based information appliances used in smart homes, etc.

Electronic apparatuses such as IoT devices, M2M devices and/or sensors may store a large amount of users' private information or affect the operation of the entire system. For example, a compromised node/device may disrupt the network operation, lead to the collapse of the entire network in a contagious manner, cause a leakage of personal privacy, or make it report false information with potentially disastrous consequences, etc.

There are a lot of attacks against a normal operation of the devices. For example, an attacker can potentially use a compromised node such as IoT devices and/or sensors not only to compromise other node but also as an entry point to undermine the system to which the node reports its data. For example, some related work on the security of IoT devices and/or sensors focuses on securing its underlying protocols or on trust and reputation management in the network. However, by exploiting existing software vulnerabilities, an adversary can easily compromise high reputation nodes without breaking their protocols.

Therefore, how to ensure the integrity (or correctness) of software running on various electronic apparatuses such as IoT devices, M2M devices and/or wireless sensor networks (WSNs), etc. becomes a security issue that needs to be solved.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to first aspect of the disclosure, it is provided a method. Said method may comprise: sending to a second device a first request for validating integrity of a program on the second device; receiving a first response from the second device, wherein the first response comprises information regarding one or more tags collected during operation of the program; and attesting integrity of the program based on the first response and an expected response.

According to second aspect of the disclosure, it is provided an apparatus. Said apparatus may comprise at least one processor, at least one memory including computer program code, the memory and the computer program code configured to, working with the at least one processor, cause the apparatus to: send to a second device a first request for validating integrity of a program on the second device; receive a first response from the second device, wherein the first response comprises information regarding one or more tags collected during operation of the program; and attest integrity of the program based on the first response and an expected response.

According to third aspect of the present disclosure, it is provided a computer program product embodied on a distribution medium readable by a computer and comprising program instructions which, when loaded into a computer, execute the following: send to a second device a first request for validating integrity of a program on the second device; receive a first response from the second device, wherein the first response comprises information regarding one or more tags collected during operation of the program; and attest integrity of the program based on the first response and an expected response.

According to fourth aspect of the disclosure, it is provided a method. Said method may comprise: receiving from a first device a first request for validating integrity of a program on the second device; collecting one or more tags during operation of the program; generating a first response comprising information regarding the one or more tags; and sending the first response to the second device.

According to fifth aspect of the disclosure, it is provided an apparatus. Said apparatus may comprise at least one processor, at least one memory including computer program code, the memory and the computer program code configured to, working with the at least one processor, cause the apparatus to receive from a first device a first request for validating integrity of a program on the second device; collect one or more tags during operation of the program; generate a first response comprising information regarding the one or more tags; and send the first response to the second device.

According to sixth aspect of the present disclosure, it is provided a computer program product embodied on a distribution medium readable by a computer and comprising program instructions which, when loaded into a computer, execute the following: receive from a first device a first request for validating integrity of a program on the second device; collect one or more tags during operation of the program; generate a first response comprising information regarding the one or more tags; and send the first response to the second device.

These and other objects, features and advantages of the disclosure will become apparent from the following detailed description of illustrative embodiments thereof, which is to be read in connection with the accompanying drawings.

DETAILED DESCRIPTION

Figure 1:
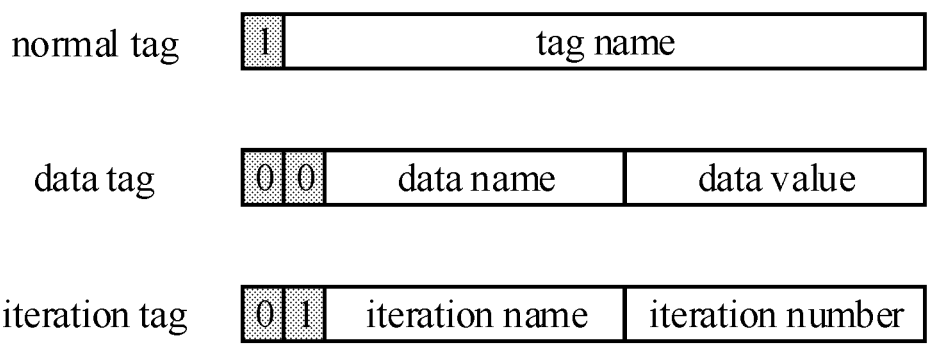
FIG. 1 depicts tag categories according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a wired or wireless network. For example, the wireless network may follow any suitable communication standards, such as new radio (NR), long term evolution (LTE), LTE-Advanced, wideband code division multiple access (WCDMA), high-speed packet access (HSPA), and so on. Furthermore, the communications between a first device and a second node in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either now known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, there are a lot of attacks against the normal operation of the devices. In order to validate the software integrity for example on an untrusted platform and determine whether it has been compromised, several attestation techniques such as remote attestation have been proposed. Remote attestation usually follows a challenge-response mechanism which may be used by a trusted entity to validate the software integrity of an untrusted platform. For example, there is usually a trusted entity called verifier who sends a challenge to other entities called provers. The provers may generate a response according to the challenge and its existing operating status. At last, the verifier may determine the prover's software integrity via the response and some previous knowledge.

Some remote attestation approaches have been proposed. They may achieve attestation by software, hardware or hybrid. Some existing remote attestation schemes are based on static attestation. That is, only the integrity of the program is verified. But runtime properties of the program are ignored. However, static attestation schemes can only verify the integrity of the program, lacking of supervision of the program's running state. The static attestation is difficult to resist some run-time attacks, such as control-flow vulnerability and non-control data vulnerability.

In addition to some traditional attacks such as replay, forgery, proxy and collusion attacks, some new attack approaches have been proposed, such as control-flow vulnerability and non-control data vulnerability. Commonly used control-flow vulnerability is stack overflow. An attacker can control a computer pointer to execute a target code. Return-oriented programming (ROP) is also a control-flow hijacking approach. ROP searches suitable instruction sequences, called "gadgets", of existing functions in an entire process space. Then it chains the gadgets to achieve malicious attacks. In addition, non-control data vulnerability can change a flow of the program by changing the values of certain variables. The characteristic of this type of attacks is to achieve the purpose of malicious attack by changing the running process of the existing program without changing the integrity of the program, as they do not need to inject new malicious code. The traditional static attestation approaches lack the ability to resist such attacks.

Furthermore, there have been many technologies of mitigation of runtime exploitation that have been studied to resist the control-flow vulnerability and non-control data vulnerability, such as Data Execution Prevention (DEP), stack cookies, Address Space Layout Randomization (ASLR), control-flow integrity (CFI) and code-pointer integrity (CPI). However, these protection mechanisms still have some defects, including for example 1) some existing control-flow attestation schemes can only resist control-flow hijacking attacks. But there is no effective defense mode for data-oriented attacks; 2) some existing control-flow attestation schemes are based on program segmentation to design a control-flow graph (CFG). While the program segmentation may be a very complicated operation, especially for some intricate structures; 3) only the correctness of the control flow is verified. But the attestation of memory integrity is lacking, 4) some existing control-flow attestation schemes cannot feedback an attack area, 5) the mitigation of runtime exploitation technologies requires changing programing language, and/or changing compiler, and/or changing machine code, and/or adding some additional hardware which are beyond the tolerance range of some IoT devices, M2M devices and/or sensors, 6) some existing control-flow attestation schemes cannot feedback a specific program execution process but only a result indicating whether attacks occurred or not, etc. Therefore, it is more meaningful to resist these attacks by an improved attestation.

To overcome at least one of the above problems or other problems, embodiments of the present disclosure propose a runtime attestation scheme. It can record the control flow without the need of CFG. In other words, there is no need for program segmentation. It can not only protect against the control-flow vulnerability, but also can resist data-oriented attacks. Besides, the proposed runtime attestation scheme can verify program integrity while ensuring the correctness of the control flow. In addition, two positioning algorithms are proposed which can quickly locate the code area where runtime attacks occurred.

There may be some differences between the proposed runtime attestation scheme of embodiments of the disclosure and the prior art as below.

Data-oriented attestation. Some existing control-flow attestation schemes can only resist control-flow hijacking attacks. But there is no effective defense against data-oriented attacks. The proposed runtime attestation scheme may make some sensitive and important information into special tags and collect them when attesting. In this way, the verifier can quickly determine whether the prover has suffered non-control data attacks during the operation.

Code integrity. Some existing attestation schemes focus on the correctness of control flow but ignore the code integrity. The proposed runtime attestation scheme may utilize the static attestation to attest the integrity of the entire program in addition to dynamic attestation.

Positioning algorithm. Some control-flow attestation schemes only determine whether the node is compromised or not. But they cannot feedback the attack area. The proposed runtime attestation scheme can quickly locate the code area where runtime attacks occurred.

New runtime attestation mode. Some runtime attestation schemes are based on the program partitioning to make the CFG. But the program segmentation may be a very complicated operation, especially for some intricate structures. The proposed runtime attestation scheme can utilize tags to measure the control flow which is more flexible and easy to realize.

The proposed runtime attestation scheme may comprise offline phase and inline phase. In the offline phase, the verifier and the prover may obtain some basic information to prepare for the attestation. For example, the prover may send to the verifier a public key pk and a hash value h of its program code. Besides, the verifier may insert at least one tag into the prover's program. The at least one tag can be divided into the following three categories.

Normal tag. This type of tag can mark the flow of normal programs. In an embodiment, the normal tag may be uniformly inserted into the entire program. The denser the insertion is, the more detailedly the control flow is attested, but the greater the overhead is. In another embodiment, at some important connection points, such as jump statements, the normal tag may be inserted. As shown in FIG. 1, the normal tag may be divided into two parts such as tag bit and tag name. For example, the beginning binary digit '1' may be used as the tag bit. The remainder may be used as the tag name. Note that the format of the normal tag may take any suitable format.

Data tag. This type of tag may be used to mark some data, such as some variables used by the statement. Data tag can disclose data-oriented attacks. Data tags may be inserted immediately after data initialization or the latest assignment. As shown in FIG. 1, the data tags may be divided into three parts such as tag bit, data name and data value. For example, the beginning two binary digits '00' may be used as the tag bit. The remaining parts are data name and data value. Note that the format of the data tag may take any suitable format.

Iteration tag. This type of tag may be used to mark loop statement. As shown in FIG. 1, the iteration tag may be divided into three parts such as tag bit, iteration name and iteration number. For example, the beginning two binary digits '01' may be used as the tag bit. The remaining parts may be used as iteration name and iteration number. The iteration number may indicate the number of loops. Note that the format of the iteration tag may take any suitable format.

The online phase may be mixed by runtime attestation and static attestation. The runtime attestation may be used to detect the control flow vulnerability and data-oriented attacks. The static attestation may be used to ensure the integrity of the binary code of the program.

Figure 2:
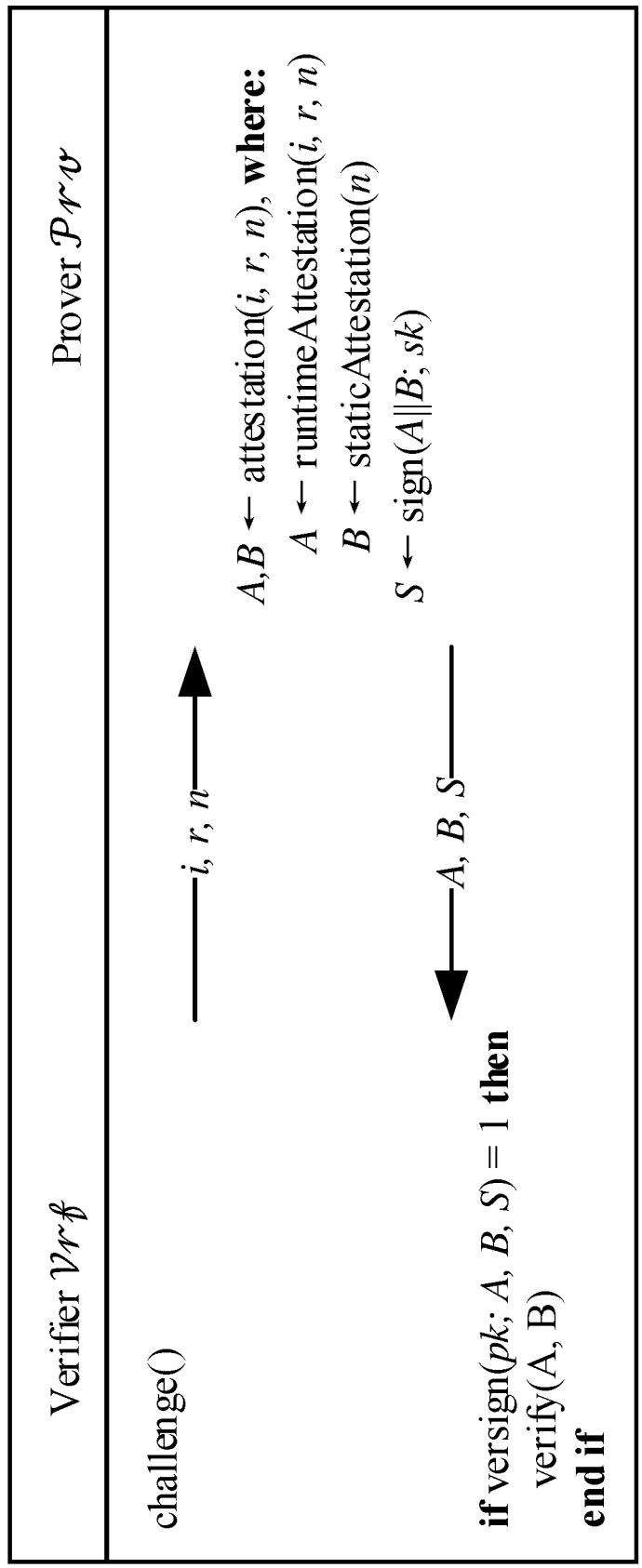
FIG. 2 is a flow chart depicting a method according to an embodiment of the present disclosure.

FIG. 2 is a flow chart depicting a method according to an embodiment of the present disclosure. As show in FIG. 2, the verifier may send to the prover a challenge which may contain parameters such as an input i, an indicator of a program region r to be attested, and a nonce n at the beginning of the attestation. The input i may be one or more parameter(s) of the program. The nonce n may ensure a freshness of the response from the prover. The program region r may be used to locate the code area where runtime attacks occurred in positioning algorithms which will be described in detail hereafter. In an embodiment, the program region r is the entire code region.

Figure 3:
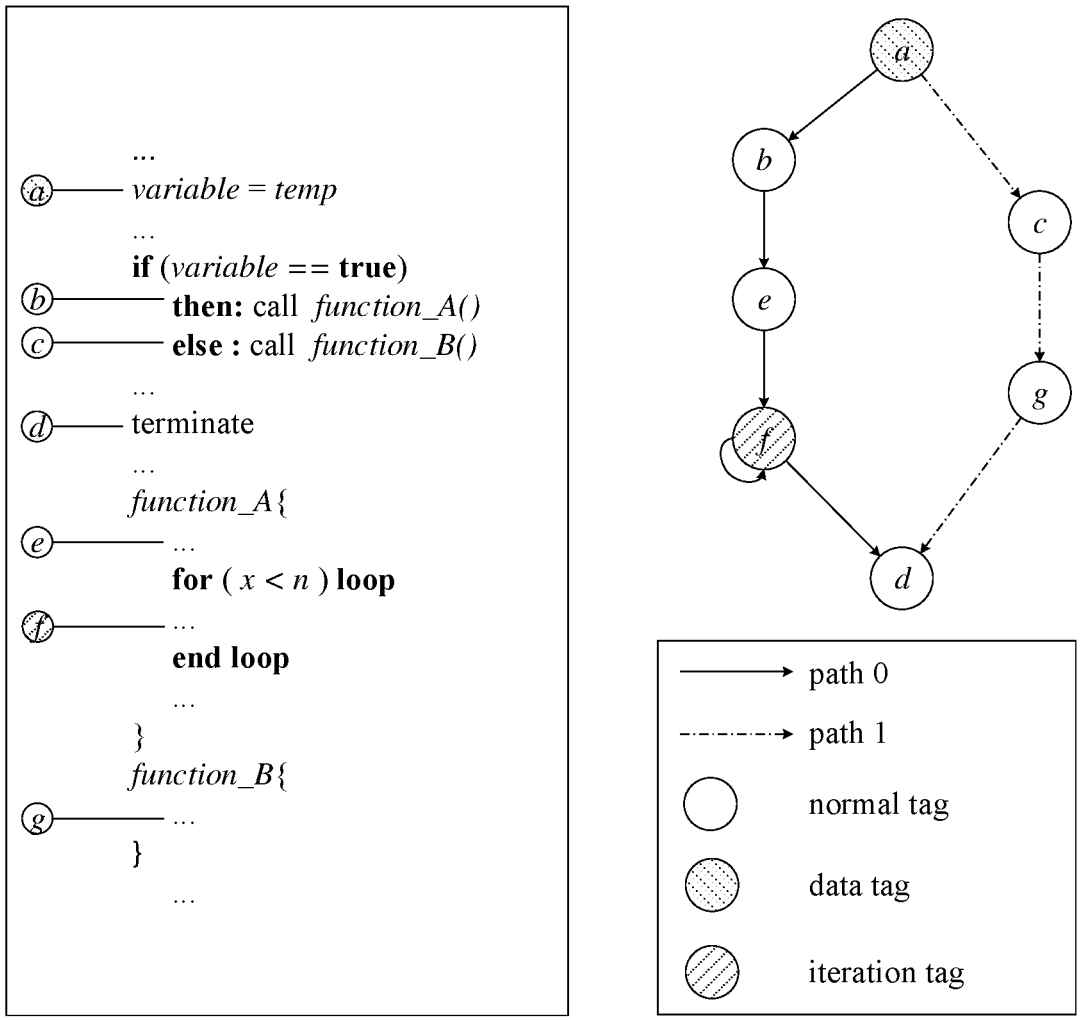
FIG. 3 schematically shows a pseudo-code which contains various tags according to an embodiment of the present disclosure.

When the prover receives the challenge, it may initiate an attestation program which may comprise runtime attestation and static attestation. The runtime attestation may collect tags generated during operation of the program. FIG. 3 schematically shows a pseudo-code which contains various tags according to an embodiment of the present disclosure. As shown in FIG. 3, the prover may calculate a runtime response A accumulated by the hash value of each tag, such as $h_a \oplus h_b \oplus h_c \oplus h_f \oplus h_d$, wherein "$\oplus$" denotes an XOR operation. In addition, the static attestation may calculate a hash value B of the code of the program. At last, the prover may send back A, B and a digital signature S=sign(A||B; sk), where "||" denotes a Logical OR operation.

The verifier may verify the signature using pk after receiving the response. Then A may be used to check the control flow and data flow of prover's program. B may be used to estimate the integrity of the prover's program.

Once the verifier determines that the prover is compromised, the verifier can utilize positioning algorithms to locate the code area where runtime attacks occurred. The verifier may use any suitable positioning algorithms. In an embodiment, the verifier may use quick positioning algorithm and/or global positioning algorithm below.

The quick positioning algorithm can quickly find a first compromised area. As show in Algorithm 1, 1 indicates a length of the code of the program, $t_f$ indicates the first compromised area, $l_{max}$ indicates the entire program and m indicates the number of tags contained in a code region. Algorithm 1 can rapidly locate the attacked area through iteration and binary search.

| Algorithm 1 Quick positioning algorithm |
| --- |
| Input: $l_{max}$ <br> Output: $t_f$ <br> 1.  quickPositioning(0, l) <br> 2.    if m <= 2 <br> 3.      return l <br> 4.    else <br> 5.      if runtimeAttestation([0, l/2]) success <br> 6.        return quickPositioning (l/2, l) <br> 7.      else <br> 8.        return quickPositioning (0, l/2) |

Quick positioning algorithm can find the first compromised area. But there may be more than one code area suffering from attacks. The global positioning algorithm can find out all the code regions where runtime attacks occurred based on the quick positioning algorithm. As show in Algorithm 2, l indicates the length of the code, T indicates all the compromised code regions, $l_{max}$ indicates the entire program and m indicates the number of tags contained in a code region.

| Algorithm 2 Global positioning algorithm |
| --- |
| Input: $l_{max}$ <br> Output: T <br> 1.  globalPositioning(0, l) <br> 2.    if m <= 2 <br> 3.      add l to T <br> 4.    else <br> 5.      if runtimeAttestation([0, l/2]) success <br> 6.        globalPositioning (l/2, l) <br> 7.      else <br> 8.      if runtime Attestation([l/2, l]) success <br> 9.        globalPositioning (0, l/2) <br> 10.     else <br> 11.        globalPositioning (0, l/2) <br> 12.        globalPositioning (l/2, l) |

Figure 4:
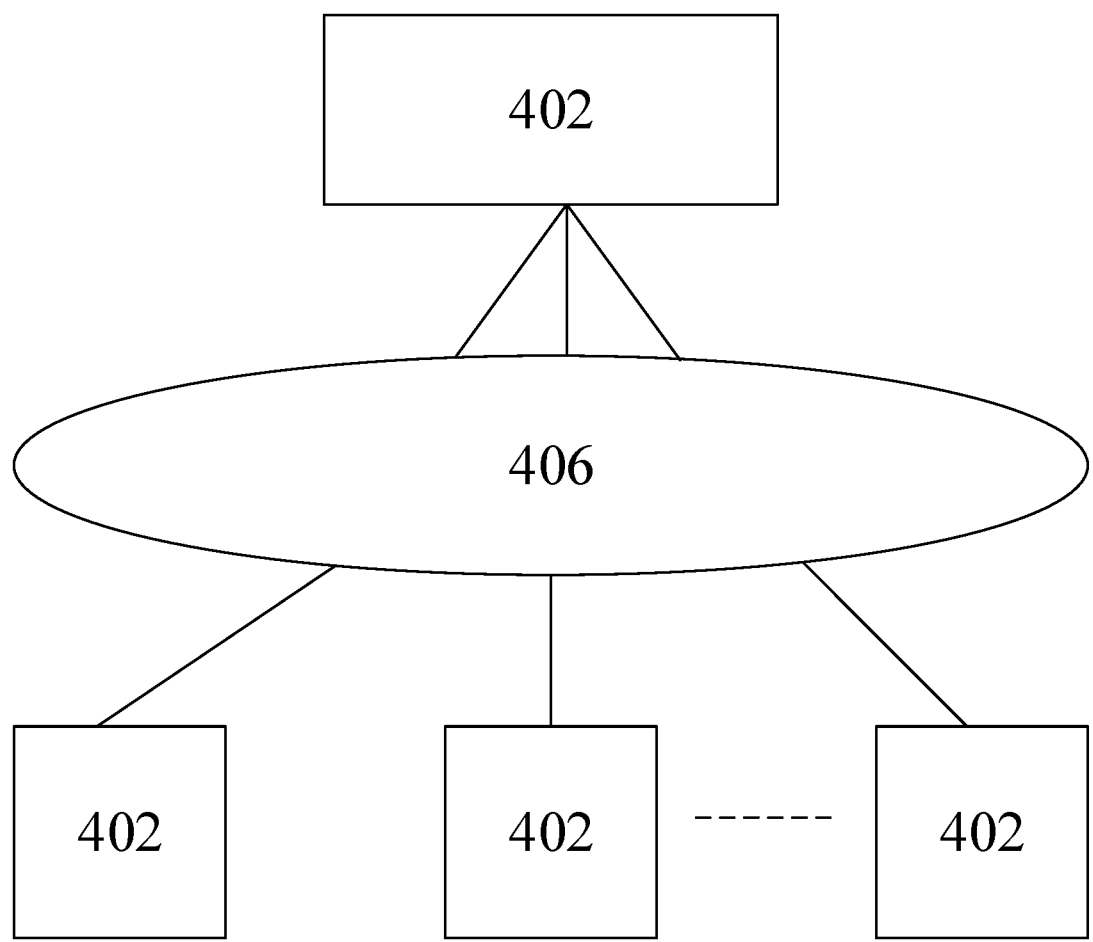
FIG. 4 depicts a schematic system, in which some embodiments of the present disclosure can be implemented.

FIG. 4 depicts a schematic system, in which some embodiments of the present disclosure can be implemented. As shown in FIG. 4, the system 400 may comprise one or more second devices 404 (i.e., the provers) each of which may operably be connected to a first device 402 (i.e., the verifier) through a communication network 406. It should be understood, however, that the first device 402 and the second devices 404 as illustrated and hereinafter described are merely illustrative of an apparatus that could benefit from embodiments of the disclosure and, therefore, should not be taken to limit the scope of the disclosure. While the first device 402 and second devices 404 are illustrated and will be hereinafter described for purposes of example, other types of apparatuses may readily employ embodiments of the disclosure.

The first device 402 can be any kind of computing devices including, but not limited to, a user equipment, a mobile computer, a desktop computer, a laptop computer, a mobile phone, a smart phone, a tablet, a server, a cloud computer, a virtual server, a computing device, a distributed system, a base station (BS), an access point (AP), a multi-cell/multi-cast coordination entity (MCE), a controller and/or any other types of electronic devices. The first device 402 may run with any kind of operating system including, but not limited to, Windows, Linux, UNIX, Android, iOS and their variants.

The second devices 404 can be any kind of computing devices including, but not limited to, an IoT device, a M2M device, a portable digital assistant (PDA), a media player, a video recorder, a mobile phone, a global positioning system (GPS) apparatus, a user equipment, a mobile computer, a desktop computer, a laptop computer, a mobile phone, a smart phone, a tablet, a server, a cloud computer, a virtual server, a computing device, a distributed system, a video surveillance apparatus such as surveillance camera, a human-machine interaction (HMI), ADAS, UAS, a camera, a glass/goggle, a smart stick, a smart watch, a necklace or other wearable device, a sensor used in various system such as an Intelligent Transportation System(ITS), a police information system, etc., a gaming device, an apparatus for assisting the disabled and/or any other types of electronic apparatus. The second devices 404 may run with any kind of operating system including, but not limited to, Windows, Linux, UNIX, Android, iOS and their variants. Moreover, the second devices 404 of at least one example embodiment need not to be an entire apparatus, but may be a component or group of components of the apparatus in other example embodiments.

The second devices 404 may provide a trusted execution environment (TEE) allowing a creation of shielded areas within an normal untrusted operating system. The trusted execution environment may be configured to perform functions related to attestation. For example, the trusted execution environment may be provided by ARM TrustZone with a trusted environment or other type of TEE-enabling processor.

As a specific example, in an IoT scenario, the second devices 404 may be an IoT device and represent a machine or other device that performs monitoring, sensing and/or measurements etc., and transmits the results of such monitoring, sensing and/or measurements etc. to another terminal device and/or a network equipment. The second devices 404 may in this case be a M2M device, which may in a 3rd generation partnership project (3GPP) context be referred to as a machine-type communication (MTC) device.

As another particular example, the second devices 404 may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, the second devices 404 may represent a vehicle or other equipment, for example, a medical instrument that is capable of monitoring, sensing and/or reporting etc. on its operational status or other functions associated with its operation.

The communication between the first device 402 and the second device 404 may be a secured communication. For example, a security channel may be established between each two parties in the system 400 by applying a secure communication protocol, e.g., transport layer security (TLS), Secure Sockets Layer (SSL), OpenSSL, Hypertext Transfer Protocol (HTTP) over TLS, HTTP over SSL, and HTTP Secure (HTTPS), etc.

Figure 5:
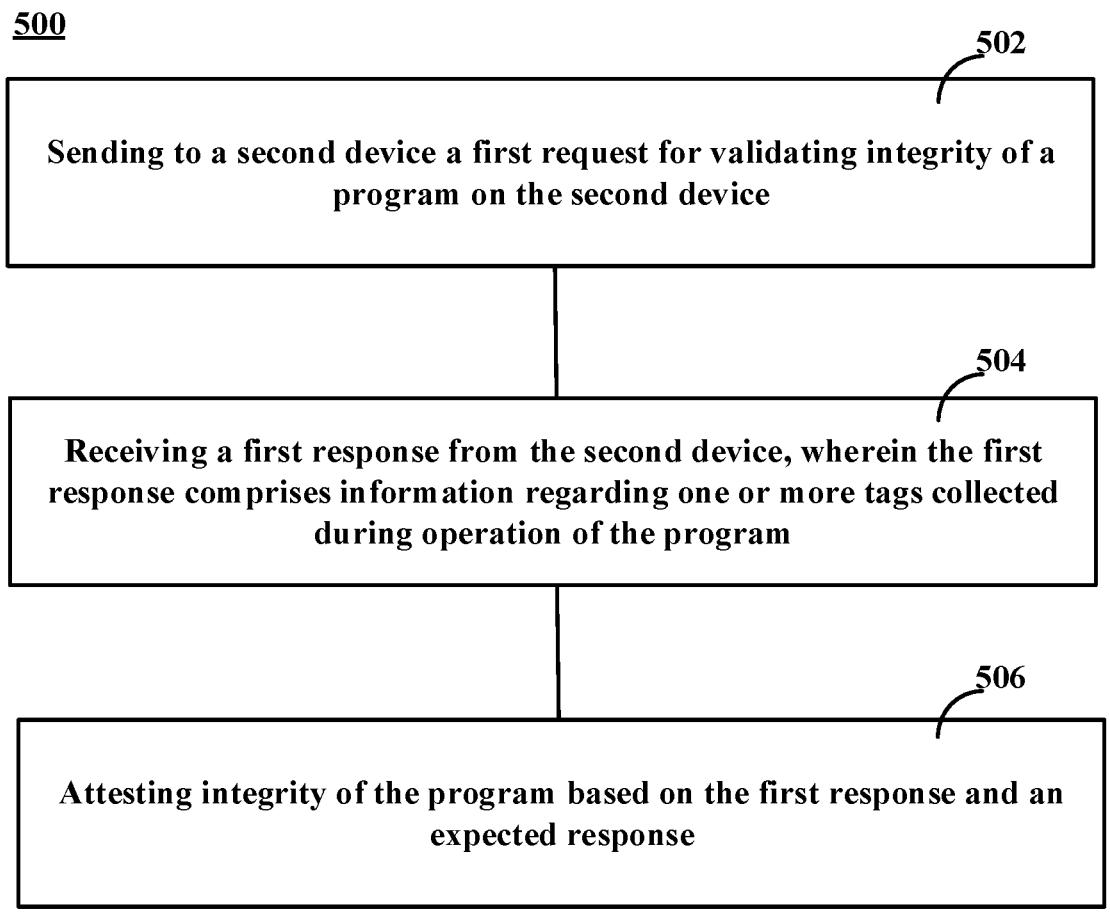
FIG. 5 is a flow chart depicting a method according to an embodiment of the present disclosure.

FIG. 5 is a flow chart depicting a method according to an embodiment of the present disclosure. The method 500 may be performed at an apparatus such as the first device 402 of FIG. 4. As such, the apparatus may provide means for accomplishing various parts of the method 500 as well as means for accomplishing other processes in conjunction with other components. For some same or similar parts which have been described with respect to FIGS. 1-4, the description of these parts is omitted here for brevity.

As shown in FIG. 5, the method 500 may start at block 502 where the first device may send to a second device a first request for validating integrity of a program on the second device. The second device may be any suitable device such as the second device 404 of FIG. 4 as described above. The program may be any suitable program which can run on the second device. The first request may be triggered by various ways. For example, the first device may periodically perform integrity verification of the program on the second device, or the second device may require the first device to perform integrity verification of the program, or the first device may perform the integrity verification when receiving an security event, or another entity such as a network device serving the second device requires the first device to perform the integrity verification of the program.

The first device may know, in advance, a correct response of the first request. Therefore, the first device challenges the second device to demonstrate that it is in a valid, expected, state. As described in the above embodiments, one or more tags may be inserted into the code of the program. For example, the one or more tags may be inserted by the first device or another entity into the code of the program. The second device may know how the one or more tags are inserted into the code of the program when the insert operation is performed by another entity.

The one or more tags may be inserted into any suitable location of the code of the program for example depending on the type of the tags. For example, the normal tag may be uniformly inserted into the entire program. In another embodiment, at some important connection points, such as jump statements, the normal tag may be inserted. Data tags can be inserted immediately after data initialization or the latest assignment. The iteration tag may be inserted after a loop statement.

The first request may be any suitable message such as a challenge. The first request may contain any suitable parameter or no parameter. When the first request contains no parameter, it may mean a default request known by both the first device and the second device. For example, when the second device receives the default request, the second device may initiate the attestation program according to the default request. When the first request contains one or more parameters, the second device may initiate the attestation program by using the one or more parameters.

In an embodiment, the first request may comprise at least one of an input parameter of the program, an indicator of one or more code regions of the program to be attested, and a nonce. The input parameter of the program may be any suitable parameter which can be input to the program, such as configuration parameter, test parameter, etc. The input parameter of the program may control the operation of the program. For example, the input parameter may lead to a result that a specific program statement(s) may be performed, a variable may be set to a specific value, a loop statement is performed at specific times, etc. The indicator may be an index of a code region of the program. For example, the program may be divided into one or more code region according to the one or more tags. As an example, a code between two neighboring tags may be defined as one code region. Note that the code region of the program may be defined by any other suitable ways which may be known by the first and second devices.

In an embodiment, the one or more tags may comprise at least one of a normal tag for example for marking a flow of the program, a data tag for example for marking a data parameter and an iteration tag for example for marking a loop statement.

At block 504, the first device may receive a first response from the second device, wherein the first response may comprise information regarding one or more tags collected during operation of the program. For example, the second device may initiate an attestation program according to the first request. The attestation program may be performed at the TEE and may comprise the runtime attestation. The runtime attestation may collect tags generated during operation of the program. For example, during operation of the program, the program may generate or output one or more tags for example if some program statements containing the one or more tags are performed.

The information regarding one or more tags may have various forms. In an embodiment, the information may comprise at least one of actual tags, a logic calculation result of the one or more tags, and a logic calculation result of the one or more tags and other parameter such as the nonce, etc. In an embodiment, the logic calculation may be an XOR operation.

The attestation program may further comprise static attestation. The static attestation may calculate a hash value of the code of the program. The code of the program may be the source code, binary code, or any other suitable type of code. In an embodiment, the first response may further comprise a hash value of code of the program.

In an embodiment, the first response further comprises a digital signature of the second device. The digital signature may be generated by using any suitable digital signature algorithm.

At block 506, the first device may attest integrity of the program based on the first response and an expected response. For example, the first device may first validate the digital signature. If the digital signature is valid, then the first device may compare the received first response with the expected or correct response to check whether they match each other. If the received first response matches the expected or correct response, then the first device may attest that the program does not suffer from attacks. Otherwise, the first device may attest that the program suffers from attacks. For example, if the information regarding one or more tags matches the expected information regarding one or more tags, the first device may attest that the program does not suffer from attacks.

In an embodiment, if the first response is not received within a predefined time period or there is no response from the second device, then the first device may determine that the program does not pass runtime attestation.

Figure 6:
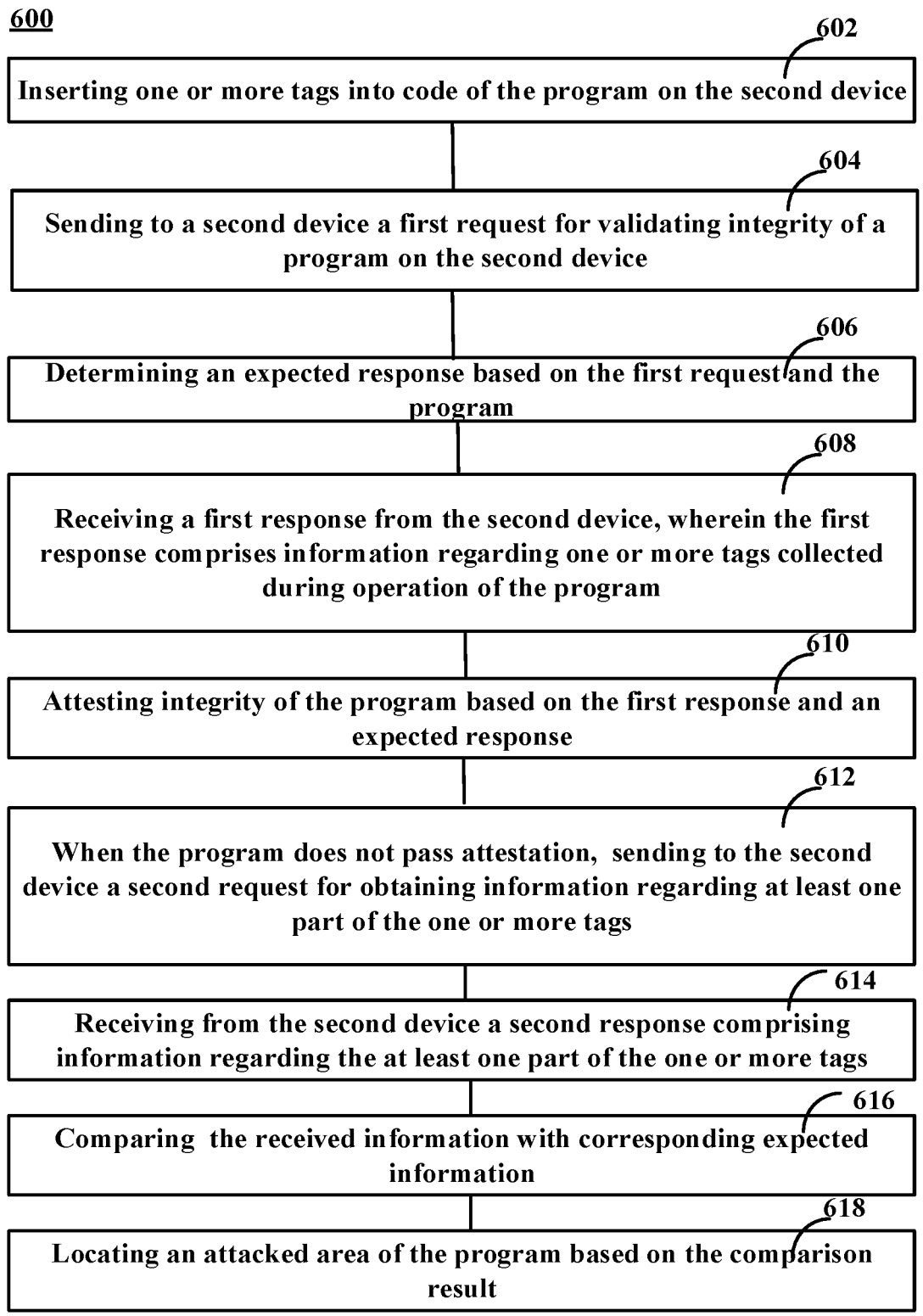
FIG. 6 is a flow chart depicting a method according to another embodiment of the present disclosure.

FIG. 6 is a flow chart depicting a method according to an embodiment of the present disclosure. The method 600 may be performed at an apparatus such as the first device 402 of FIG. 4. As such, the apparatus may provide means for accomplishing various parts of the method 600 as well as means for accomplishing other processes in conjunction with other components. For some same or similar parts which have been described with respect to FIGS. 1-7, the description of these parts is omitted here for brevity.

At block 602, the first device may insert one or more tags into code of the program on the second device. For example, the first device may obtain the code of the program and insert one or more tags into code of the program. The one or more tags may be inserted into any suitable location of the code of the program for example depending on the type of the tags as described above.

At block 604, the first device may send to the second device a first request for validating integrity of a program on the second device. Block 604 is similar to block 502 and the description thereof is omitted here for brevity.

At block 606, the first device may determine an expected response based on the first request and the program. For example, the first device may run the program by itself based on the first request, and then obtain the expected response. As another example, the first device may analyse the program based on the first request, and then obtain the expected response.

At block 608, the first device may receive a first response from the second device, wherein the first response comprises information regarding one or more tags collected during operation of the program. Block 608 is similar to block 504 and the description thereof is omitted here for brevity.

At block 610, the first device may attest integrity of the program based on the first response and an expected response. Block 610 is similar to block 506 and the description thereof is omitted here for brevity.

At block 612, when the program does not pass runtime attestation, the first device may send to the second device a second request for obtaining information regarding at least one part of the one or more tags. The at least one part of the one or more tags may be determined by using various ways. For example, the one or more tags may be grouped into any suitable number of parts. Alternatively, the one or more tags may be firstly grouped into two parts, and then each of the two parts may be further grouped into two parts, and so on. In an embodiment, the at least one part of the one or more tags may be determined based on a binary search algorithm as shown in the above quick positioning algorithm and Global positioning algorithm. Each part may be assigned an index.

At block 614, the first device may receive from the second device a second response comprising information regarding the at least one part of the one or more tags. In an embodiment, the information regarding at least one part of the one or more tags may comprise a logic calculation result of the at least one part of the one or more tags. The logic calculation may be any suitable logic calculation. In an embodiment, the logic calculation is an XOR operation.

At block 616, the first device may compare the received information with corresponding expected information. For example, if the information comprises the logic calculation result of tags 1 and 2, then the first device may compare the received logic calculation result with corresponding expected logic calculation result of tags 1 and 2.

At block 618, the first device may locate an attacked area of the program based on the comparison result. For example, if the logic calculation result of tags 1 and 2 does not match the expected logic calculation result of tags 1 and 2, then the first device may determine that a code region relate to the tags 1 and 2 may be attacked.

Blocks 612, 614, 616 and 618 may implement the above quick positioning algorithm or Global positioning algorithm.

Figure 7:
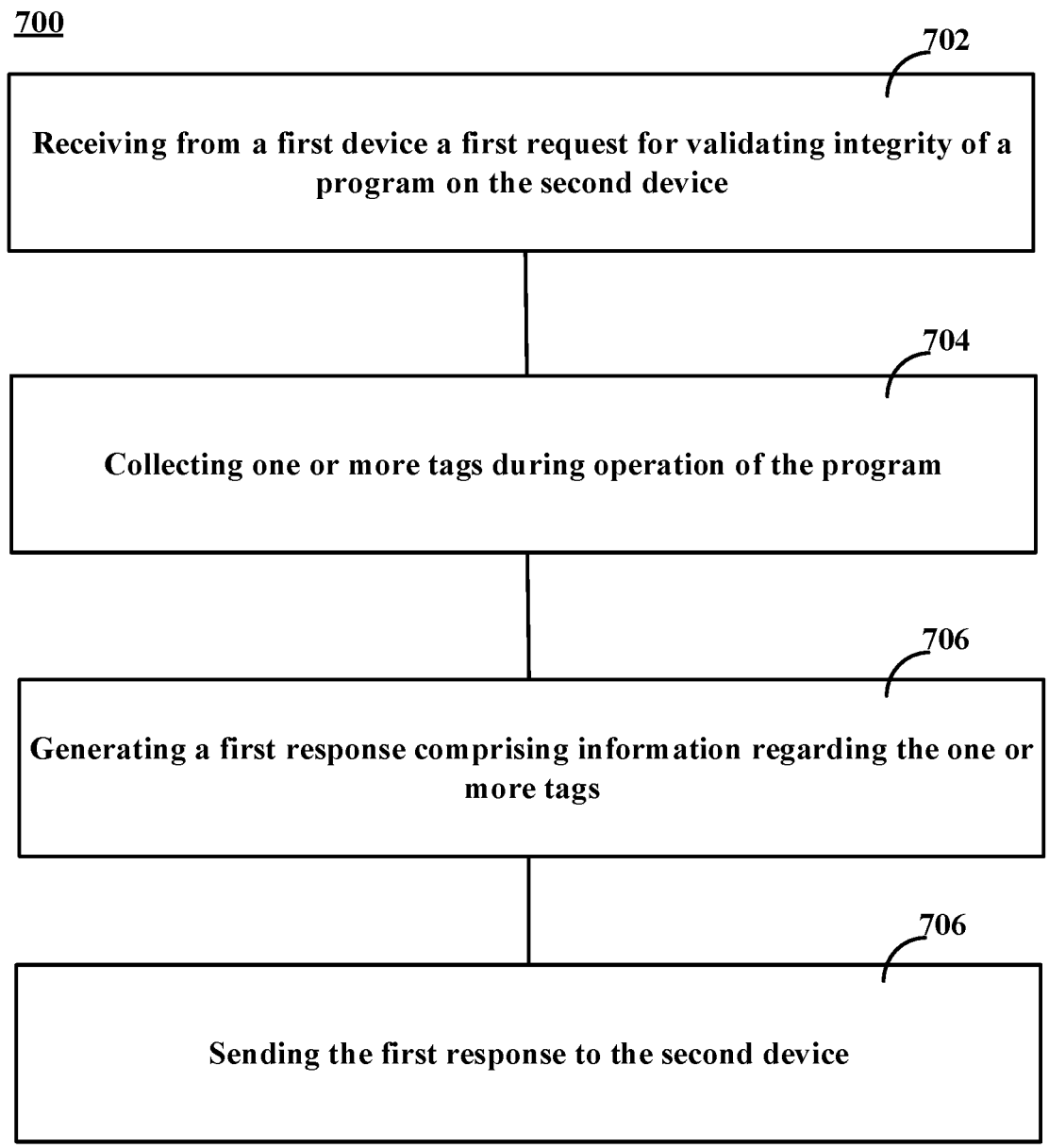
FIG. 7 is a flow chart depicting a method according to another embodiment of the present disclosure.

FIG. 7 is a flow chart depicting a method according to an embodiment of the present disclosure. The method 700 may be performed at an apparatus such as the second device 404 of FIG. 4. As such, the apparatus may provide means for accomplishing various parts of the method 700 as well as means for accomplishing other processes in conjunction with other components. For some same or similar parts which have been described with respect to FIGS. 1-6, the description of these parts is omitted here for brevity.

At block 702, the second device 404 may receive from a first device a first request for validating integrity of a program on the second device. The first device may be any suitable device such as the first device 402 as described above. The program may be any suitable program which can run on the second device. The first request may be triggered by various ways as described above.

As described in the above embodiments, one or more tags may be inserted into the code of the program. For example, the one or more tags may be inserted by the first device or another entity into the code of the program. The one or more tags may be inserted into any suitable location of the code of the program for example depending on the type of the tags. The second device may know or does not know how the tags are inserted into the code of the program.

The first request may be any suitable message such as a challenge. The first request may contain any suitable parameter or no parameter. When the first request contains no parameter, it may mean a default request. For example, when the second device receives the default request, the second device may initiate the attestation program according to the default request. When the first request contains one or more parameters, the second device may initiate the attestation program by using the one or more parameters.

In an embodiment, the first request may comprise at least one of an input parameter of the program, an indicator of one or more code regions of the program to be attested, and a nonce as described above. In an embodiment, the one or more tags may comprise at least one of a normal tag for example for marking a flow of the program, a data tag for example for marking a data parameter and an iteration tag for example for marking a loop statement.

At block 704, the second device may collect one or more tags during operation of the program. For example, the second device may initiate an attestation program according to the first request. The attestation program may be performed at TEE and may comprise runtime attestation. The runtime attestation may collect tags generated during operation of the program. For example, during operation of the program, the program may generate or output a tag for example if some program statements containing this tag are performed. The attestation program may further comprise static attestation. The static attestation may calculate a hash value of the code of the program. The code of the program may be the source code, binary code, or any other suitable type of code. In an embodiment, the first response may further comprise a hash value of code of the program.

At block 706, the second device may generate a first response comprising information regarding the one or more tags. The information regarding one or more tags may have various forms. In an embodiment, the information may comprise at least one of actual tags, a logic calculation result of the one or more tags, a logic calculation result of the one or more tags and other parameter such as the nonce, etc. In an embodiment, the logic calculation is an XOR operation.

In an embodiment, the first response further comprises a digital signature of the second device. The digital signature may be generated by using any suitable digital signature algorithm.

At block 708, the second device may send the first response to the second device.

Figure 8:
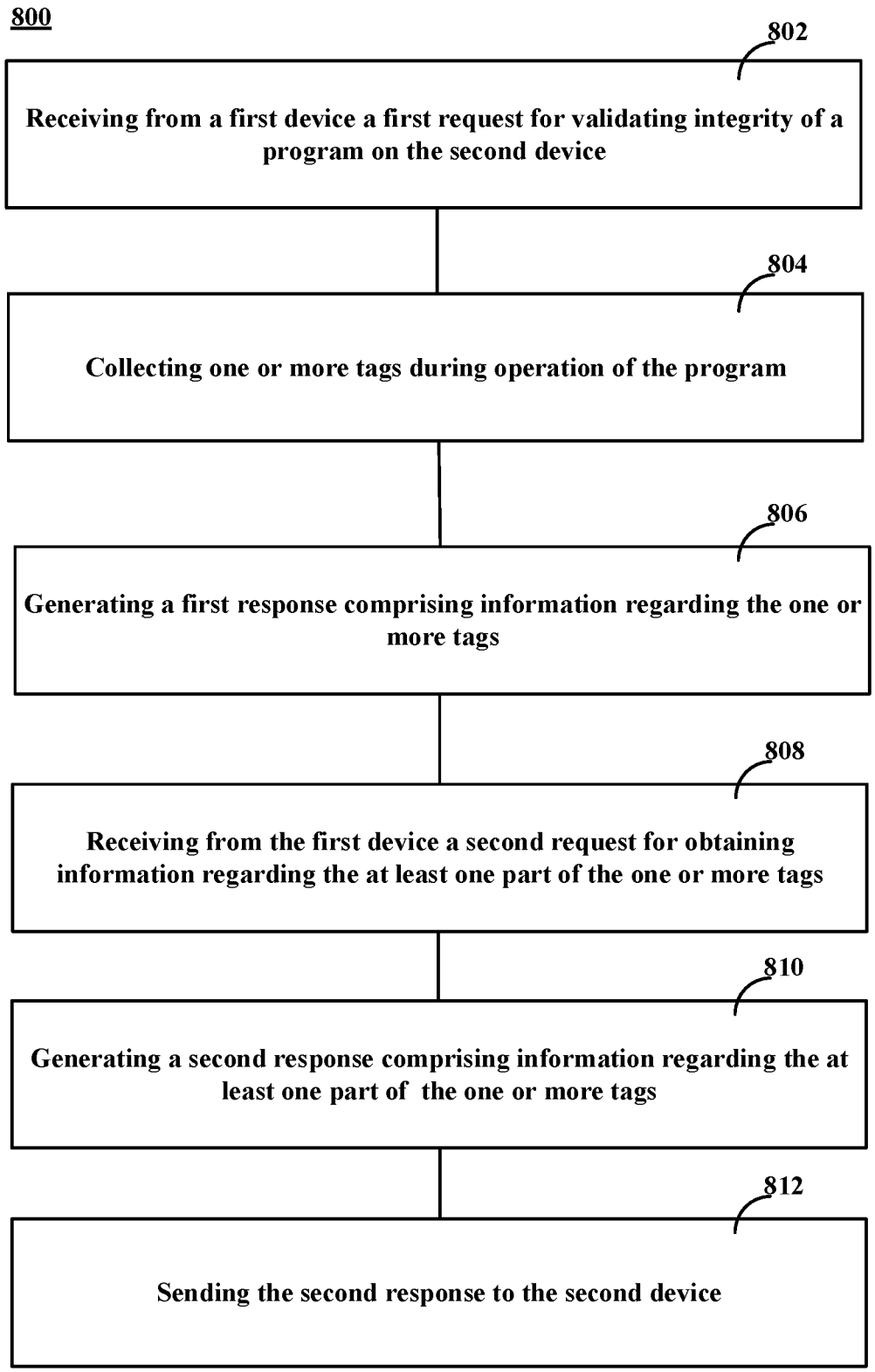
FIG. 8 is a flow chart depicting a method according to another embodiment of the present disclosure.

FIG. 8 is a flow chart depicting a method according to an embodiment of the present disclosure. The method 800 may be performed at an apparatus such as the second device 404 of FIG. 4. As such, the apparatus may provide means for accomplishing various parts of the method 800 as well as means for accomplishing other processes in conjunction with other components. For some same or similar parts which have been described with respect to FIGS. 1-7, the description of these parts is omitted here for brevity. Blocks 802, 804, 806 and 808 are similar to blocks 702, 704, 706 and 708 and the description thereof is omitted here for brevity.

At block 810, the second device may receive from the first device a second request for obtaining information regarding at least one part of the one or more tags. For example, when the program does not pass runtime attestation, the first device may send to the second device a second request for obtaining information regarding at least one part of the one or more tags. The at least one part of the one or more tags may be determined by using various ways. For example, the one or more tags may be grouped into any suitable number of parts. Alternatively, the one or more tags may be firstly grouped into two parts, and then each of the two parts may be further grouped into two parts, and so on. In an embodiment, the at least one part of the one or more tags may be determined based on a binary search algorithm as shown in the above quick positioning algorithm and Global positioning algorithm. Each part may be assigned an index.

At block 810, the second device may generate a second response comprising information regarding the at least one part of the one or more tags. In an embodiment, the information regarding at least one part of the one or more tags may comprise a logic calculation result of the at least one part of the one or more tags. The logic calculation may be any suitable logic calculation. In an embodiment, the logic calculation is an XOR operation.

At block 812, the second device may send the second response to the second device.

In an embodiment, the methods 700 and/or 800 are performed at a trusted execution environment and the collected one or more tags are stored in the trusted execution environment.

Figure 9:
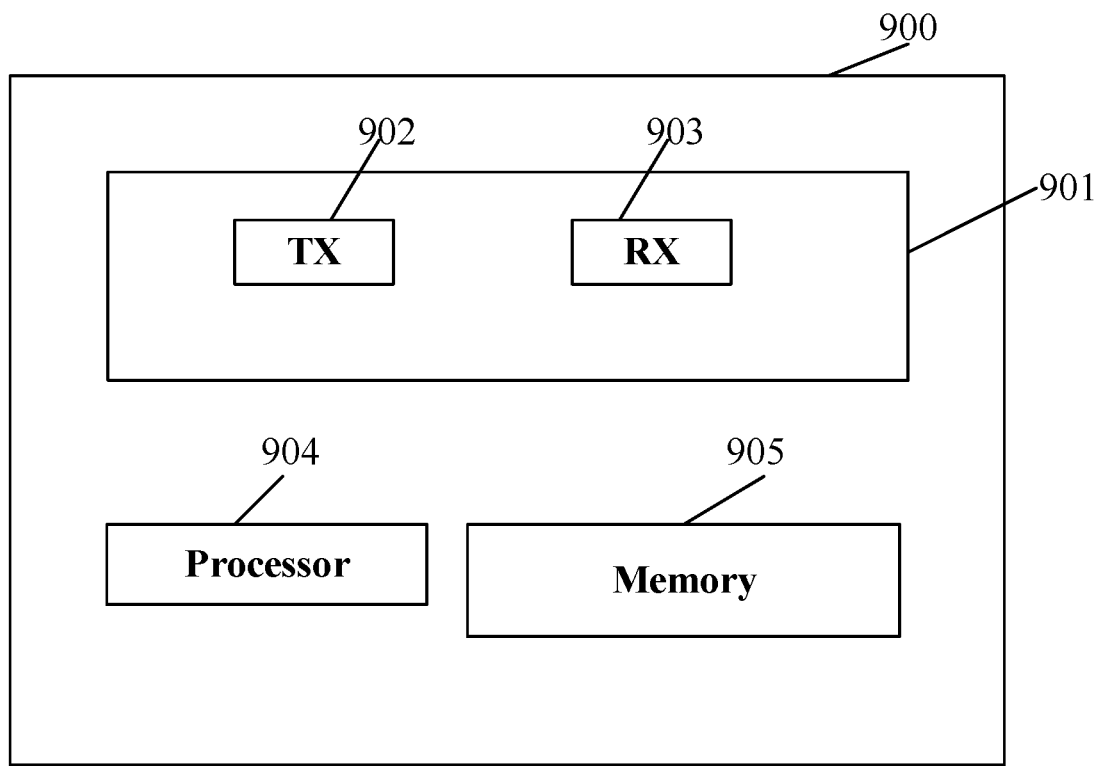
FIG. 9 shows a simplified block diagram of an apparatus according to an embodiment of the present disclosure.

FIG. 9 shows a simplified block diagram of an apparatus according to an embodiment of the present disclosure. The apparatus 900 can be implemented as a first device or a module thereof as shown in FIG. 4. As shown in FIG. 9, the apparatus 900 comprises a processor 904, a memory 905, and a transceiver 901 in operative communication with the processor 904. The transceiver 901 comprises at least one transmitter 902 and at least one receiver 903. While only one processor is illustrated in FIG. 9, the processor 904 may comprises a plurality of processors or multi-core processor(s). Additionally, the processor 904 may also comprise cache to facilitate processing operations. For some same or similar parts which have been described with respect to FIGS. 1-8, the description of these parts is omitted here for brevity.

Computer-executable instructions can be loaded in the memory 905 and, when executed by the processor 904, cause the apparatus 900 to implement the above-described methods. In particular, the computer-executable instructions can cause the apparatus 900 to send to a second device a first request for validating integrity of a program on the second device; receive a first response from the second device, wherein the first response comprises information regarding one or more tags collected during operation of the program; and attest integrity of the program based on the first response and an expected response.

In an embodiment, the computer-executable instructions can cause the apparatus 900 to insert the one or more tags into code of the program.

In an embodiment, the computer-executable instructions can cause the apparatus 900 to determine the expected response based on the first request and the program.

In an embodiment, the computer-executable instructions can cause the apparatus 900 to determine that the program does not pass integrity verification if the first response is not received within a predefined time period or there is no response from the second device.

In an embodiment, when the program does not pass runtime attestation, the computer-executable instructions can cause the apparatus 900 to send to the second device a second request for obtaining information regarding the at least one part of the one or more tags; receive from the second device a second response comprising information regarding the at least one part of the one or more tags; compare the received information with corresponding expected information; and locate an attacked area of the program based on the comparison result.

In an embodiment, the at least one part of the one or more tags is determined based on a binary search algorithm.

In an embodiment, the information regarding one or more tags comprises a logic calculation result of the one or more tags, the information regarding the at least one part of the one or more tags comprises a logic calculation result of the at least one part of the one or more tags.

In an embodiment, the logic calculation is an XOR operation.

In an embodiment, the first response further comprises a hash value of code of the program.

In an embodiment, the first response further comprises a digital signature of the second device.

In an embodiment, the one or more tags comprise at least one of a normal tag, a data tag and an iteration tag.

In an embodiment, the first request comprises at least one of an input parameter of the program, an indicator of one or more code regions of the program to be attested, and a nonce.

Figure 10:
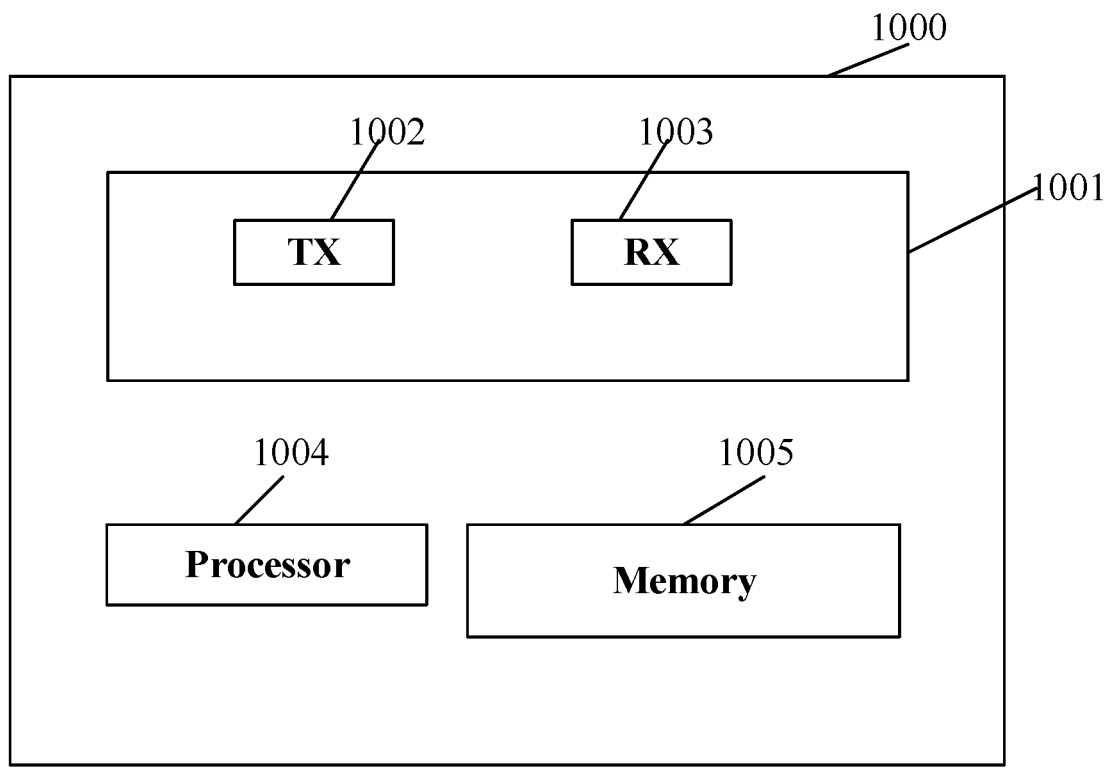
FIG. 10 shows a simplified block diagram of an apparatus according to an embodiment of the present disclosure.

FIG. 10 shows a simplified block diagram of an apparatus according to an embodiment of the present disclosure. The apparatus 1000 can be implemented as a second device or a module thereof as shown in FIG. 4. As shown in FIG. 10, the apparatus 1000 comprises a processor 1004, a memory 1005, and a transceiver 1001 in operative communication with the processor 1004. The transceiver 1001 comprises at least one transmitter 1002 and at least one receiver 1003. While only one processor is illustrated in FIG. 10, the processor 1004 may comprises a plurality of processors or multi-core processor(s). Additionally, the processor 1004 may also comprise cache to facilitate processing operations. For some same or similar parts which have been described with respect to FIGS. 1-8, the description of these parts is omitted here for brevity.

Computer-executable instructions can be loaded in the memory 1005 and, when executed by the processor 1004, cause the apparatus 1000 to implement the above-described methods. In particular, the computer-executable instructions can cause the apparatus 1000 to receive from a first device a first request for validating integrity of a program on the second device; collect one or more tags during operation of the program; generate a first response comprising information regarding the one or more tags; and send the first response to the second device.

In an embodiment, the one or more tags are inserted into code of the program.

In an embodiment, the computer-executable instructions can cause the apparatus 1000 to receive from the first device a second request for obtaining information regarding the at least one part of the one or more tags; generate a second response comprising information regarding the at least one part of the one or more tags; and send the second response to the second device.

In an embodiment, the at least one part of the one or more tags is determined based on a binary search algorithm.

In an embodiment, the information regarding one or more tags comprises a logic calculation result of the one or more tags, the information regarding the at least one part of the one or more tags comprises a logic calculation result of the at least one part of the one or more tags.

In an embodiment, the logic calculation is an XOR operation.

In an embodiment, the first response further comprises a hash value of code of the program.

In an embodiment, the first response further comprises a digital signature of the second device.

In an embodiment, the one or more tags comprise at least one of a normal tag, a data tag and an iteration tag.

In an embodiment, the first request comprises at least one of an input parameter of the program, an indicator of one or more code regions of the program to be attested, and a nonce.

In an embodiment, the apparatus comprises at a trusted execution environment and the collected one or more tags are stored in the trusted execution environment.

Figure 11:
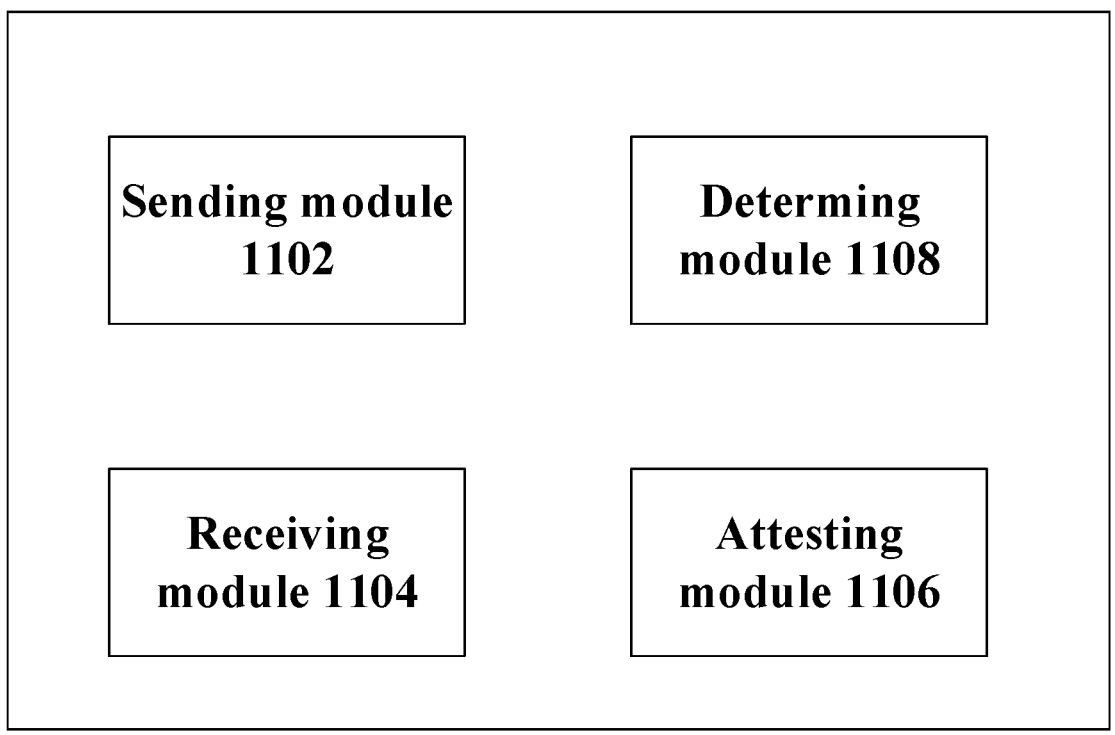
FIG. 11 shows a simplified block diagram of an apparatus according to an embodiment of the present disclosure.

FIG. 11 shows a simplified block diagram of an apparatus according to an embodiment of the present disclosure. The apparatus 1100 can be implemented as a first device or a module thereof as shown in FIG. 4. As shown in FIG. 11, the apparatus 1100 comprises a sending module 1102 configured to send to a second device a first request for validating integrity of a program on the second device; a receiving module 1104 configured to receive a first response from the second device, wherein the first response comprises information regarding one or more tags collected during operation of the program; and a attesting module 1106 configured to attest integrity of the program based on the first response and an expected response.

In an embodiment, the apparatus 1100 further comprises a inserting module 1106 configured to insert the one or more tags into code of the program.

In an embodiment, the apparatus 1100 further comprises a determining module 1108 configured to determine the expected response based on the first request and the program.

In an embodiment, the attesting module 1106 is further configured to attest determine that the program does not pass integrity verification if the first response is not received within a predefined time period or there is no response from the second device.

In an embodiment, the sending module 1102 may send to the second device a second request for obtaining information regarding the at least one part of the one or more tags. The receiving module 1104 may receive from the second device a second response comprising information regarding the at least one part of the one or more tags. The apparatus may further comprise a comparing module 1108 configured to compare the received information with corresponding expected information; and a locating module configured to locate an attacked area of the program based on the comparison result.

Figure 12:
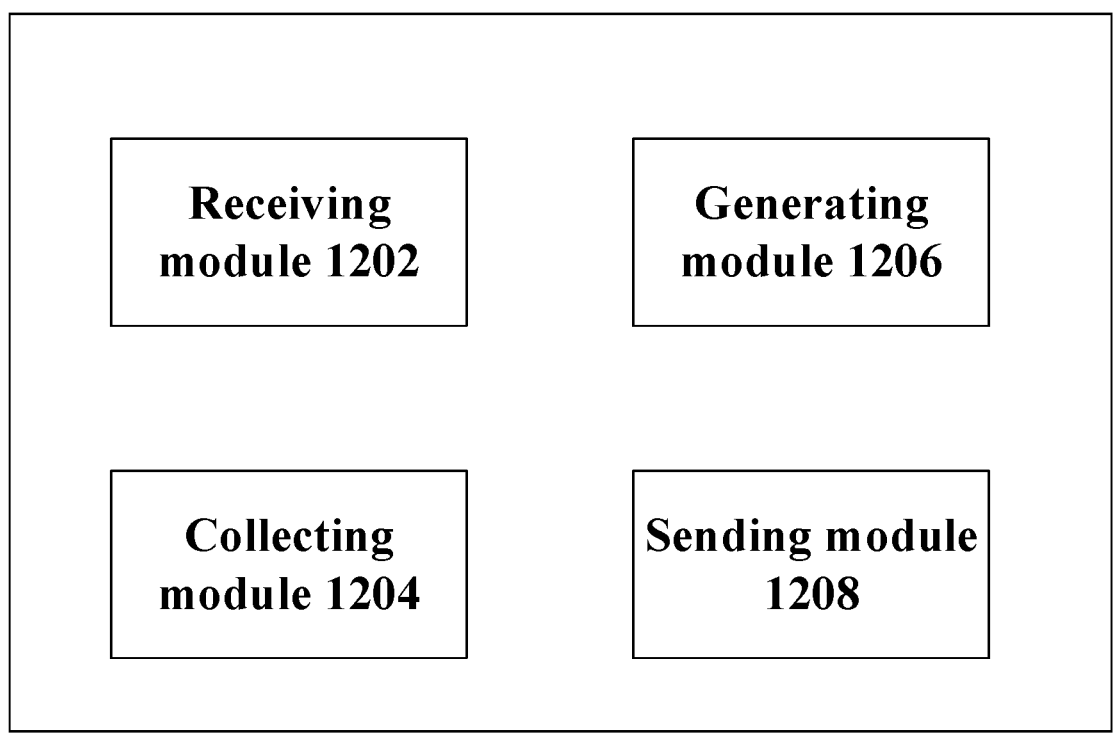
FIG. 12 shows a simplified block diagram of an apparatus according to an embodiment of the present disclosure.

FIG. 12 shows a simplified block diagram of an apparatus according to an embodiment of the present disclosure. The apparatus 1200 can be implemented as a second device or a module thereof as shown in FIG. 4. As shown in FIG. 12, the apparatus 1200 comprises a receiving module 1202 configured to receive from a first device a first request for validating integrity of a program on the second device; a collecting module 1204 configured to collect one or more tags during operation of the program; a generating module 1206 configured to generate a first response comprising information regarding the one or more tags; and a sending module 1208 configured to send the first response to the second device.

In an embodiment, the receiving module 1202 is further configured to receive from the first device a second request for obtaining information regarding the at least one part of the one or more tags; the generating module 1206 is further configured to generate a second response comprising information regarding the at least one part of the one or more tags; and the sending module 1208 is further configured to send the second response to the second device.

In an embodiment, the apparatus 1200 comprises at a trusted execution environment and the collected one or more tags are stored in the trusted execution environment.

The embodiments of the disclosure may offer some advantages as follows. The embodiments of the disclosure can resist the data-oriented attacks. The embodiments of the disclosure can not only attest the control flow and the data flow of the prover but also estimate the integrity of the entire program by the way mixing dynamic attestation and static attestation. The embodiments of the disclosure can quickly locate the code area where runtime attacks occurred. The embodiments of the disclosure do not need program segmentation. The embodiments of the disclosure utilize tags to measure the control flow which is more flexible and easy to realize.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, random access memory (RAM), read only memory (ROM), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially simultaneously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method implemented at a first device, comprising:
   sending to a second device a first request for validating integrity of a program on the second device;
   receiving a first response from the second device, wherein the first response comprises information regarding one or more tags collected during operation of the program; and
   attesting integrity of the program based on the first response and an expected response.

2. The method according to claim 1, further comprising:
   inserting the one or more tags into code of the program.

3. The method according to claim 1, further comprising:
   determining the expected response based on the first request and the program.

4. The method according to claim 1, wherein attesting integrity of the program based on the first response and an expected response comprises:
   if the first response is not received within a predefined time period or there is no response from the second device, determining that the program does not pass integrity verification.

5. The method according to claim 1, wherein when the program does not pass runtime attestation, the method further comprises:
   sending to the second device a second request for obtaining information regarding the at least one part of the one or more tags;
   receiving from the second device a second response comprising information regarding the at least one part of the one or more tags;
   comparing the received information with corresponding expected information; and
   locating an attacked area of the program based on the comparison result.

6. The method according to claim 5, wherein the at least one part of the one or more tags is determined based on a binary search algorithm.

7. The method according to claim 5, wherein the information regarding one or more tags comprises a logic calculation result of the one or more tags, the information regarding the at least one part of the one or more tags comprises a logic calculation result of the at least one part of the one or more tags.

8. The method according to claim 7, wherein the logic calculation is an XOR operation.

9. The method according to claim 1, wherein the first response further comprises a hash value of code of the program.

10. The method according to claim 1, wherein the first response further comprises a digital signature of the second device.

11. The method according to claim 1, wherein the one or more tags comprise at least one of a normal tag, a data tag and an iteration tag.

12. A method implemented at a second device, comprising:
receiving from a first device a first request for validating integrity of a program on the second device;
collecting one or more tags during operation of the program;
generating a first response comprising information regarding the one or more tags; and
sending the first response to the first device.

13. The method according to claim 12, wherein the one or more tags are inserted into code of the program.

14. The method according to claim 12, further comprising:
receiving from the first device a second request for obtaining information regarding the at least one part of the one or more tags;
generating a second response comprising information regarding the at least one part of the one or more tags; and
sending the second response to the first device.

15. The method according to claim 14, wherein the at least one part of the one or more tags is determined based on a binary search algorithm.

16. The method according to claim 14, wherein the information regarding one or more tags comprises a logic calculation result of the one or more tags, the information regarding the at least one part of the one or more tags comprises a logic calculation result of the at least one part of the one or more tags.

17. The method according to claim 16, wherein the logic calculation is an XOR operation.

18. The method according to claim 12, wherein the first response further comprises a hash value of code of the program.

19. The method according to claim 12, wherein the first response further comprises a digital signature of the second device.

20. The method according to claim 12, wherein the one or more tags comprise at least one of a normal tag, a data tag and an iteration tag.

* * * * *